(12) United States Patent
Doshi et al.

(10) Patent No.: US 9,292,423 B1
(45) Date of Patent: Mar. 22, 2016

(54) MONITORING APPLICATIONS FOR COMPATIBILITY ISSUES

(71) Applicant: Amazon Technologies, Inc., Seattle, WA (US)

(72) Inventors: Japan Shailesh Doshi, Bangalore (IN); Rajesh Jain, Bangalore (IN); Sanyu Kiruluta, Oakland, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/644,713

(22) Filed: Mar. 11, 2015

(51) Int. Cl.
*G06F 9/44* (2006.01)
*G06F 11/36* (2006.01)

(52) U.S. Cl.
CPC ........ *G06F 11/3692* (2013.01); *G06F 11/3664* (2013.01); *G06F 11/3684* (2013.01); *G06F 11/3688* (2013.01)

(58) Field of Classification Search
USPC ................................................. 717/123–129
IPC ........ G06F 11/3692,11/3664, 11/3668, 11/3604
See application file for complete search history.

(56) References Cited

U.S. PATENT DOCUMENTS

| | | | | |
|---|---|---|---|---|
| 5,313,616 A * | 5/1994 | Cline | ................... | G06F 11/3612 713/323 |
| 6,981,245 B1 * | 12/2005 | Schwabe | ....................... | 717/126 |
| 7,032,213 B1 * | 4/2006 | Lupu et al. | ..................... | 717/129 |
| 7,272,823 B2 * | 9/2007 | Ball | .............................. | 717/125 |
| 7,340,726 B1 * | 3/2008 | Chelf | ........................ | G06F 8/71 714/38.12 |
| 7,401,321 B2 * | 7/2008 | Sit | ....................... | G06F 11/3664 714/E11.207 |
| 7,543,274 B2 * | 6/2009 | Hinchey | .................... | G06F 8/20 717/123 |
| 7,594,219 B2 * | 9/2009 | Ramachandran et al. | ..... | 717/124 |
| 7,644,395 B1 * | 1/2010 | Frey | ..................... | G06F 11/3636 709/224 |
| 7,827,534 B2 * | 11/2010 | Vetillard et al. | .............. | 717/126 |
| 7,941,789 B2 * | 5/2011 | Ivanov | ................ | G06F 11/3495 714/45 |
| 7,979,847 B2 * | 7/2011 | Danton et al. | ................ | 717/125 |
| 8,082,541 B2 * | 12/2011 | Pramanick | ......... | G01R 31/3183 717/124 |
| 8,397,218 B2 * | 3/2013 | Bates et al. | .................... | 717/125 |
| 8,402,442 B1 * | 3/2013 | Chan | ..................... | G06F 11/267 714/25 |

(Continued)

OTHER PUBLICATIONS

Guo et al, "Technical Construction Methods for E-Marketplace", ACM, pp. 366-369, 2009.*

(Continued)

*Primary Examiner* — Anil Khatri
(74) *Attorney, Agent, or Firm* — Lee & Hayes, PLLC

(57) ABSTRACT

A compatibility service monitors programs to detect compatibility issues. The compatibility service provides users, such as developers, with notifications of compatibility issues a program may experience when the program executes on a particular device and/or uses a particular operating system. In some configurations, the compatibility service detects compatibility issues by performing tests on programs using a testing service. The compatibility service may also receive notifications of incompatibilities from different sources. For example, the compatibility service may receive notifications of incompatibilities from other users (e.g., developers), web sites, and the like. The compatibility service may proactively notify developers of compatibility issues for their programs. For example, one developer may request to be notified of all detected compatibility issues, whereas another developer might request to be notified of compatibility issues that are above some specified severity level of incompatibility.

17 Claims, 10 Drawing Sheets

(56) References Cited

U.S. PATENT DOCUMENTS

| | | | | |
|---|---|---|---|---|
| 8,479,161 B2 * | 7/2013 | Weigert | ............... | G06F 8/75 |
| | | | | 717/124 |
| 8,650,543 B1 * | 2/2014 | Winch | ............... | 717/124 |
| 8,689,188 B2 * | 4/2014 | Bassin et al. | ............... | 717/124 |
| 8,707,264 B2 * | 4/2014 | Hossain et al. | ............... | 717/124 |
| 8,782,607 B2 * | 7/2014 | Andersen | ............... | G06F 11/0793 |
| | | | | 717/101 |
| 8,869,115 B2 * | 10/2014 | Bruns | ............... | G06F 9/4443 |
| | | | | 717/124 |
| 8,904,357 B2 * | 12/2014 | Eade | ............... | G06F 8/20 |
| | | | | 717/125 |

OTHER PUBLICATIONS

Frantz et al, "A Software Development Kit to Implement Integration Solutions", ACM, pp. 1647-1652, 2012.*
Yoon et al, "Effective and Scalable Software Compatibility Testing", ACM, pp. 63-73, 2008.*
Claes et al, "A Historical Analysis of Debian Package Incompatibilities", IEEE, pp. 212-223, 2015.*
Ranganath et al, "Compatibility Testing using Patterns-based Trace Comparison", ACM, pp. 469-478, 2014.*
Yoon et al, "Direct-Dependency-based Software Compatibility Testing", ACM, pp. 409-412, 2007.*

* cited by examiner

MONITORING APPLICATIONS FOR COMPATIBILITY ISSUES

BACKGROUND

The number of available models of smartphones and tablet computing devices has grown exponentially during the last few years. The various models of smartphones, tablets, and other computing devices frequently have different hardware configurations, even when the devices are configured to execute the same operating system. For example, different smartphone models based upon the ANDROID operating system might include different processors, different amounts of memory, and different peripheral devices, such as cameras, global positioning system ("GPS") sensors, and others. These devices might also include significant variations in software configurations. For example, some models might be configured with different versions of the ANDROID operating system and/or with different software installed on the devices by the manufacturers of the devices. Smartphone and tablet devices executing other operating systems from other manufacturers might also include great variations in hardware and software.

The significant variation in the software and hardware configuration of smartphone, tablet, and other types of computing devices can make it difficult for developers to create programs that execute properly on a wide range of devices. For example, a developer might test the operation of their program on a single device that they own. It is, however, usually cost prohibitive for a developer to purchase many physical devices to use for testing. A program that does not execute properly can be frustrating to both the developer and to the customers that purchase the program.

DETAILED DESCRIPTION

Figure 1:
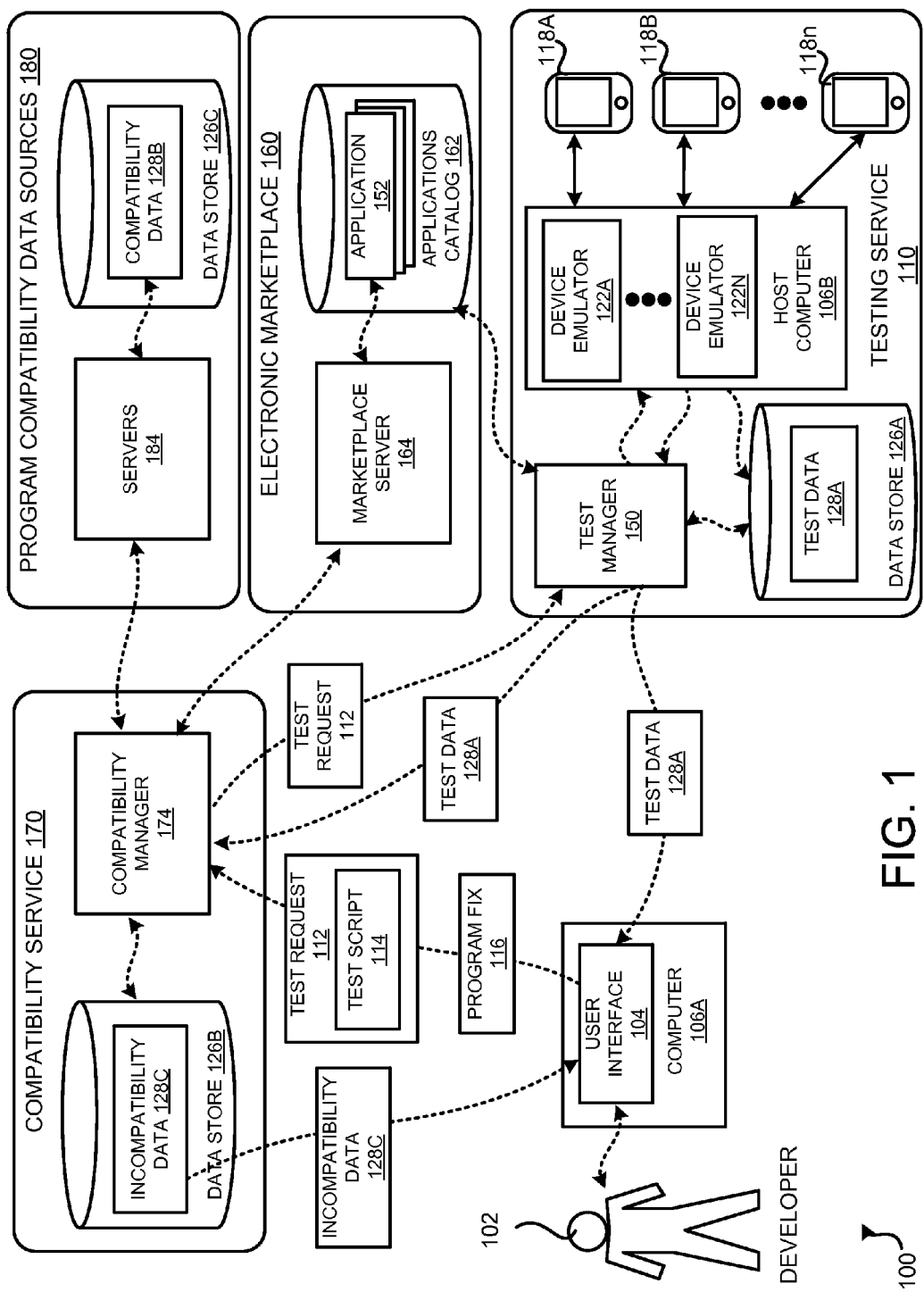
FIG. 1 is a block diagram depicting an illustrative operating environment in which programs may be monitored for compatibility issues.

The following detailed description is directed to technologies for monitoring programs for compatibility issues. Utilizing the technologies described herein, a compatibility service may provide developers with notifications identifying compatibility issues that a program may experience when the program executes on a particular device and/or uses a particular operating system or other software. As used herein, the term "compatibility issue" may refer to any issue that causes a program to not operate or behave as intended. The term "program" or "application", as used herein, may refer to any sequence of instructions to perform a specified task. In some examples, a program or application may be application software and/or system software. The compatibility service may detect compatibility issues by performing tests on programs. The compatibility service may also access or obtain information identifying compatibility issues from other sources. For example, the compatibility service may receive notifications of incompatibilities from other users (e.g., developers), access data related to compatibility issues for programs from web sites, and the like.

According to some configurations, the compatibility service may proactively notify developers of compatibility issues for their programs. For example, one developer may request to be notified of all detected compatibility issues, whereas another developer might request to be notified of compatibility issues that are above some specified severity level. As used herein, the term "severity level" refers to a level indicating how much an identified incompatibility affects a program. For instance, a "high severity level" may refer to an incompatibility that causes a program to crash; whereas a "low severity level" may refer to an incompatibility that causes a program to operate improperly only in some instances (e.g. display does not always rotate properly when user rotates device).

In some configurations, the compatibility service may perform tests on the programs in response to an occurrence of different events. For example, the compatibility service or a testing service may perform tests on one or more programs in response to receiving a new or updated test from a developer. In some instances, the programs may be tested in response to a test being created or updated by the compatibility service, a testing service, or some other authorized user. The compatibility service might also cause the programs to be tested at specified times. For instance, the compatibility service might test the programs daily, weekly, monthly, or the like.

The compatibility service may provide notifications of incompatibilities using different mechanisms. For example, the compatibility service may provide electronic messages (e.g., emails, or text messages) to users of the compatibility service of the incompatibility. The compatibility service might also provide a user interface ("UI") that may be accessed by the developers to view information about program incompatibilities. For instance, a UI might be provided that displays health information for programs of a developer.

The health information might include information such as detected incompatibilities, severity levels of the detected incompatibilities, possible fixes for the detected incompatibilities, tests run to detect the incompatibilities, and the like. The UI might also provide testing information such as screenshots, test logs, data obtained from other users or web sites, and the like. In some configurations, the UI might also be utilized by a user to submit tests and/or fixes to the compatibility service.

The submitted tests and fixes might be made available to other users (e.g., developers) of the compatibility service. For example, a user might submit a test that may be run by a testing service associated with the compatibility service to test for incompatibilities not only for the programs of the user but also by other users. According to some examples, the user may submit a test script that may be used to test one or more programs. As used herein, the term "test script" may refer to a set of instructions that may be performed when testing the program. In some examples, the test script may be made available to other users of the compatibility service.

In some configurations, the user might also use the UI to perform one or more tests. For instance, a user might login to the compatibility service using the UI, select a compatibility test to perform on a program, and view the results of the test within the UI. In some cases, a user might submit fixes to the incompatibilities to the compatibility service. For example, one developer might submit information about how to fix a particular incompatibility issue such that other developers might utilize the information to address incompatibility issues with their programs.

According to some configurations, the compatibility service may test all or a portion of the programs or applications that are associated with one or more application stores. As used herein, an "application store" may refer to a digital distribution platform for programs. Some example application stores include the AMAZON™ Appstore, GOOGLE PLAY™, APPLE™ APP STORE™, and the like. For example, the compatibility service might utilize a testing service that tests the operation of programs on a wide variety of physical computing devices and/or device emulators. Results of these tests may be provided (e.g., through electronic messages, notifications or the UI) to the users of the compatibility service. The testing might be used to detect possible device compatibility issues with one or more devices (e.g., a program crash) or determine the amount of resources (e.g., memory) the program uses during operation. Through the testing and the sharing of information with developers, the developers may improve the likelihood that their program will execute properly on a wide range of computing devices.

The developer may utilize the test results to modify aspects of the operation of the program. In this way, a developer can utilize the compatibility service and the testing service described above to quickly, easily and economically determine compatibly issues as well as to test the operation of a program. Additional details regarding the various components and processes described above for monitoring programs for incompatibilities will be presented below with regard to FIGS. 1-9.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. As mentioned briefly above, the technologies described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a block diagram depicting an illustrative operating environment 100 in which programs may be monitored for compatibility issues. As shown in FIG. 1, a compatibility service 170 might utilize a compatibility manager 174 to monitor applications 152 for compatibility issues. Generally, the compatibility service 170 may provide developers, such as the developer 102, with notifications of compatibility issues that a program, such as the application 152, may experience when the program executes on a particular device and/or uses a particular operating system or other software.

In the illustrated example, the compatibility service 170 may be provided by a computer environment including several computer systems that are interconnected using one or more networks. For example, one or more server computers may be utilized to provide the compatibility service 170 that includes the compatibility manager 174. The compatibility manager 174 may be configured to manage the monitoring of the applications 152 for compatibility issues. The applications 152 that are monitored for compatibility issues may be available from one or electronic marketplaces 160.

As illustrated, the electronic marketplace 160 may include a marketplace server 164 and an applications catalog 162 including applications 152. According to an example, the electronic marketplace 160 is operated and owned independently from the software providers that submit the applications 152 for inclusion in the electronic marketplace 160. In this regard, it should be appreciated that the electronic marketplace 160 may have fewer or more components than are illustrated in FIG. 1. Thus, the depiction of the electronic marketplace 160 in FIG. 1 should be taken as illustrative and not limiting to the present disclosure. As discussed above, the electronic marketplace 160 might be configured as an application store.

The electronic marketplace 160 may make the applications 152 available to customers. In particular, a customer may utilize a computer, such as a computer similar to the computer 106A, to access the electronic marketplace 160. The customer may then browse and acquire applications 152 made available in the electronic marketplace 160 by providers such as software providers (e.g., independent software vendors ("ISVs")) or the operator of the electronic marketplace 160. A customer may select and acquire an application 152 from the electronic marketplace 160.

The marketplace server 164 facilitates submission of the applications 152 by ISVs, or other software providers and browsing and acquisition by customers of applications offered through the electronic marketplace 160. Accordingly, a software provider such as an ISV, utilizing a software provider computing device 150 may submit one or more applications 152 to the electronic marketplace 160 via the marketplace server 164. The submitted applications 152 may or may not be completely compatible with each of the computing devices to which it is downloaded.

In some configurations, the applications 152 may be an executable or interpreted program configured for executing on a computing device, such as a smartphone, a tablet computing device, an e-reader device, or another type of computing device. In this regard, it should be appreciated that while the examples disclosed herein are primarily presented in the context of smartphone computing devices, the technologies disclosed herein might also be utilized with other types of computing devices. For example, and without limitation, the technologies disclosed herein might be utilized with tablet computing devices, video game devices, set-top box devices, and other types of computing devices. The specific configurations disclosed herein should not be construed as being limited to a smartphone device or a device from a particular manufacturer.

As briefly discussed above, the compatibility service 170 may proactively notify the developer 102 of compatibility issues for their programs. In some cases, the developer 102 may specify when to receive messages or notifications relating to compatibility issues. For example, the developer 102 may request to be notified of compatibility issues that exceed a specified threshold (e.g., severe compatibility issues such as crashes of the application 152). The compatibility service 170 may provide notifications of incompatibilities using different mechanisms. For example, the compatibility service 170 may provide electronic messages (e.g., emails, or text messages) to users of the compatibility service identifying the incompatibility. The compatibility service 170 might also provide the UI 104 that may be accessed by the developer 120 to view compatibility issue data 128C about one or more of the applications 152. For example, the developer 102 might view compatibility issue data 128C for the programs they developed or manage.

The compatibility issue data 128 might include health information for one or more of the applications 152 such as detected incompatibilities, severity levels of the detected incompatibilities, possible fixes for the detected incompatibilities, tests run to detect the incompatibilities, and the like. The UI 104 might also provide testing information such as screenshots, test logs, data obtained from other users or web sites, and the like. In some configurations, the UI 104 might also be utilized by the developer 102 to submit a test script 114 and/or a program fix 116 to the compatibility service 170. The submitted test scripts 114 and fixes 116 might be made available to other users of the compatibility service 170. For example, the developer 102 might submit the test script 114 that may be used by the testing service 110 to test for incompatibilities not only for the programs of the developer 102 but also by other developers.

In some configurations, the developer 102 might also use the UI 104 to perform one or more tests. For instance, the developer 102 might login to the compatibility service 170 using the UI 104, select a test to perform on the application 152, and view the results of the test (e.g., the test data 128A) within the UI 104.

According to some configurations, the compatibility service 170 may test all or a portion of the programs that are associated with one or more application stores. As discussed above, the compatibility service 170 may instruct the testing service 110 (e.g., using the test request 112) to test the operation of one or more applications 152 on a wide variety of physical computing devices and/or device emulators. The testing might be used to detect possible device compatibility issues with one or more devices (e.g., a program crash) or determine the amount of resources (e.g., memory) the program uses during operation.

During testing of an application 152, the test manager 150 might programmatically interact with the application 152. Some of the interactions might be programmatically and/or manually performed, and may include, but are not limited to, simulating touch on a display screen, text entry, contextual selections (e.g., radio boxes, check boxes), key-presses or button selections to the program, simulate or make changes in orientation of the computing device, simulate or make changes in a position or orientation of a user in relation to the computing device, programmatically assert on different variables used in the program, verify and/or assert the text displayed in different in UI elements by the application 152, change device settings (e.g., wireless, power, display), simulate the presence or removal of external devices (e.g., a speaker, a keyboard) and provide other kinds of tests implementations. In some examples, the test manager 150 sends (e.g., injects) the actions or events to the application 152 such that the application 152 programmatically reacts to the sent action or event. For example, sending a touch event that simulates a user touching a UI element may cause the application 152 to generate a new display screen.

One or more stress tests that send pseudo random events to a device while an application 152 is being tested might also be performed. For example, one or more settings that are associated with a device might be changed (e.g., turn on/off wireless internet, Bluetooth). In some examples, various device settings may be randomly selected during the testing. In other examples, a list of device settings may be programmatically or manually changed during the testing.

As the test is being performed on the application 152, different test data 128A may be recorded. The recorded test data 128A might be automatically (e.g., programmatically) or manually analyzed to determine an impact on parameters, such as, but not limited to battery life, CPU, memory usage, network traffic or other operational aspects. According to some examples, selected metrics may be recorded at specified intervals (e.g., every five seconds, ten seconds) during the testing of the application 152. In other examples, the metrics may be recorded at other intervals.

In some configurations, the compatibility service 170 selects the one or more computing devices 118 within the testing service 110 that are to be utilized for testing the operation of the application 152. In other configurations, the developer 102 might be permitted to select one or more computing devices 118 within the testing service 110 that are to be utilized for testing the operation of one or more applications 152. For example, a list of available devices 118 might be presented to the developer 102 via the user interface 104. In other implementations, the particular device 118, or devices 118, upon which a program is to be tested might be selected through an analysis of the application 152 being tested or about to be tested. For example, if the application 152 has been created for use with a particular operating system or device type, this information might be utilized to select the device 118, or devices 118, upon which the application 152 is to be tested.

In some examples, the compatibility service 170 and/or the developer 102 might also be permitted to test the operation of the applications 152 on device emulators 122 provided by the testing service 110. The device emulator 122 may be a software emulation of a computing device. Utilizing this mechanism, the testing service 110 can simultaneously test the operation of applications 152 upon actual physical computing devices 118 and upon device emulators 122.

As briefly discussed, the compatibility service 170 and/or the developer 102 can select the specific device, or devices to use when testing the application 152. The compatibility service 170 and/or developer 102 might also be permitted to select the devices by the operating system version that the devices are executing. In other implementations, the compatibility service 170 and/or developer 102 might also be permitted to select devices for testing based upon the type of hardware, software, or other aspects of the devices. For example, the compatibility service 170 and/or developer 102 might request that the application 152 be tested on devices having a camera and a particular version of the ANDROID operating system. A compatibility service 170 and/or developer 102 might be permitted to select devices, and/or device emulators, for use in testing the applications 152 based upon one or more of, a device manufacturer, a device type, a device version, device hardware, operating system version, other software version, or other attributes of a device.

The compatibility service 170 and/or the developer 102 may submit a test request 112 to the testing service 110. In some examples, the test request 112 may include the application 152, or a reference (e.g., name or link) to the applications 152 to be tested. In other examples, the test request 112 might also include data identifying the devices 118 and/or emulators upon which to perform the testing of the application 152. In other examples, the test request 112 may include the test to perform.

In response to receiving the test request 112, various components within the testing service 110 may be configured to cause testing to be performed on the applications 152 while executing on the specified devices 118 and/or device emulators 122. For instance, in the example shown in FIG. 1, the testing service 110 includes a host computer 106B that has several computing devices 118A-118N attached thereto. In some configurations, the computing devices 118A-118N are various models of smartphones or tablet computing devices executing the ANDROID operating system. In other examples, the computing devices 118A-118N are various models of smartphones or tablet computing devices executing other types of operating systems. The computing devices 118A-118N might be connected to the host computer 106B by way of a suitable wired connection, such as a USB connection. The computing devices 118A-118N might also be connected to the host computer 106B by way of a suitable wireless connection.

In other implementations, the computing devices 118A-118N are smartphone devices that include only hardware that is unique to the device. For example, a device 118 might be a development motherboard that includes only a processor and memory that is unique to a particular model of mobile computing device. Other hardware devices utilized by the mobile computing device that are common across various devices might be emulated by software executing on the host computer 116. In this way, the cost of each of the devices 118A-118N might be reduced. Other types of development boards and or platforms might also be connected to a host computer 106B in the testing service 110 for use in testing in the manner disclosed herein.

In the example shown in FIG. 1, the host computer 106B may also execute a number of device emulators 122A-122N. The device emulators 122A-122N may be executing on the physical hardware of the host computer 106B, or in other configurations might be executing within virtual machines executing on the host computer 106B. Other mechanisms for executing the device emulators 122A-122N might also be utilized.

In order to test the operation of the applications 152, the applications 152 may be installed on the computing devices 118A-118N and/or device emulators 122A-122N specified by the compatibility service 170 and/or the developer 102 (which may also be referred to herein as "the test devices"). Once the application 152 has been installed on the test devices, the test manager 150 may test the operation of the application 152 upon the test devices. In some configurations, these tests may be performed simultaneously, thereby allowing the testing of an application 152, or applications 152, on multiple computing devices 118 and/or device emulators 122 simultaneously.

In some configurations, the test manager 150 selects the actions to programmatically perform based on the type of computing device 116 or the device emulator 122 utilized to perform the test. According to some configurations, the test manager 150 may check whether the application 152 is using a particular Application Programming Interface ("API") to identify at least a portion of the actions to perform. For example, the test manager 150 may select to simulate an action that changes a viewing location of a user relative to the device in response to determining that the application 152 uses an API that is related to viewing of lenticular images. According to some configurations, the events or tests that may be programmatically performed by the test manager 150 might be any action that may be performed by a user when executing the application 152.

As the testing is being performed, test data 128A may be captured and stored in the data store 126A, or some other location. For example, the test data 128A might include one or more screen captures 140 that are captured when the application 152 is executing. The screen captures 140 may show a current visual state of the application 152 that occurs in response to the programmatically performed interaction. For example, the test manager 150 may simulate a tap event that is at the location of a shopping cart icon that causes the shopping cart display screen to be generated.

As discussed above, the test data 128A may include information about the screen displays accessed, the elements identified on the screen displays and the interactions performed during the testing.

All or a portion of the test data 128A may be provided in real-time as program testing occurs or provided at some other point in time. For example, textual data, graphical representations of data, the screen captures, or other types of data generated by a device 116 or a device emulator 122 upon which testing is being performed might be included in the test data 128A and provided to the developer 102. In some examples, the test data 128A are provided in a UI, such as a graphical UI ("GUI"). Example GUIs for presenting test data 128A are shown in FIG. 2B and described below. In other examples, the test data 128A may be provided in a document, e-mailed, or the like.

The test data 128A might summarize the results of the testing and/or provide more detailed information regarding the performance of the testing. For example, the test data 128A can describe the success or failure of the tests, may provide logs and/or other information from the computing devices 118 and/or the device emulator 122 collected during the performance of the tests, and might provide other information. In some examples, the test manager 150 uses the performance metrics 142 and/or other test data 128A, to determine a minimum set of requirements needed to operate the application 152. For instance, the test data 128A or the recorded performance metrics might indicate (e.g., based on memory usage or CPU usage) that the application 152 requires a certain amount of memory or a certain type of processor (e.g., at least a 2 GHZ processor).

As briefly discussed above, the compatibility manager 174 may obtain compatibility data 128B from one or more program compatibility data sources 180. In some examples, the compatibility manager 174 receives or obtains the compatibility data 128B from one or more servers 184 that may be associated with one or more web sites. For instance, the compatibility manager 174 may access one or more web sites provided by the servers 184 that include data relating to the functioning or the compatibility of the applications 152. The web sites might be programming web sites, review web sites, and the like. In other examples, the compatibility manager 174 might receive the compatibility data 128B from one or more users (e.g., a developer).

The compatibility manager 174 may use the received test data 128 and the compatibility data 128B to identify the compatibility issues for one or more of the applications 152. For example, the test data 128 may indicate some compatibility issues and the compatibility data 128B may indicate other compatibility issues. In some instances, the test data 128A and the compatibility data 128B may indicate the same compatibility issues. According to some configurations, the compatibility manager 174 may remove duplicate compatibility issues from the incompatibility data 128C. After identifying the incompatibilities, the compatibility manager 174 may provide all or a portion of the incompatibility data 128C to the developer 102. As discussed above, the compatibility manager 174 might send a message to the developer 102 and/or allow the user to access the incompatibility data 128C using the UI 104, or some other mechanism.

Once the developer 102 has received the test data 128A and/or the incompatibility data 128C, the developer 102 might utilize the test data 128A and/or the incompatibility data 128C to modify the operation of one or more of the applications 152. The developer 102 might then utilize the testing service 110 described above repeatedly to continue testing the operation of the application 152.

As briefly discussed above, the testing service 110 and/or the compatibility service 170 may causes tests to be performed on the programs or applications 152 in response to an occurrence of different events. For example, the compatibility service 170 may instruct the testing service 110 to perform tests on one or more programs in response to receiving a new or updated test from the developer 102. For example, the compatibility service 170 or the testing service 110 may determine the programs to test that include functionality tested by a newly submitted test or an updated test. In some instances, the programs may be tested by the testing service 110 in response to a test being created or updated by the compatibility service 170, the testing service 110, or some other authorized user. The compatibility service 170 and/or the testing service 110 might also cause programs to be tested at specified times. For instance, the compatibility service 170 might instruct the testing service 110 to test the programs daily, weekly, monthly, or the like. Additional details regarding the operation of the compatibility service 170 and the testing service 110 will be provided below with regard to FIGS. 2-9.

Figure 2A:
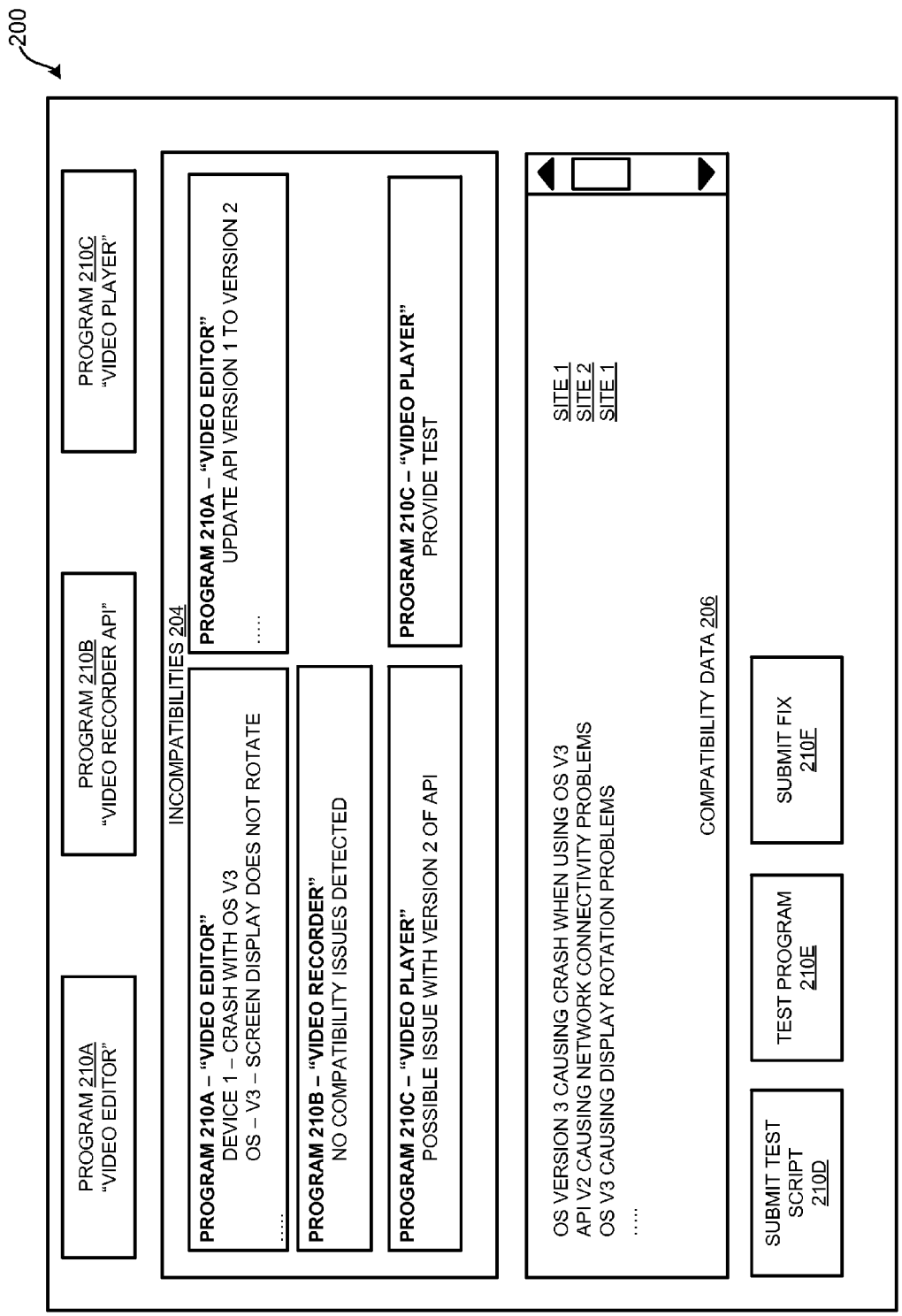
FIGS. 2A-2B are screen diagrams showing illustrative graphical user interfaces ("GUIs") that display user interface ("UI") elements that are associated with the monitoring of applications for compatibility issues.
Figure 2B:
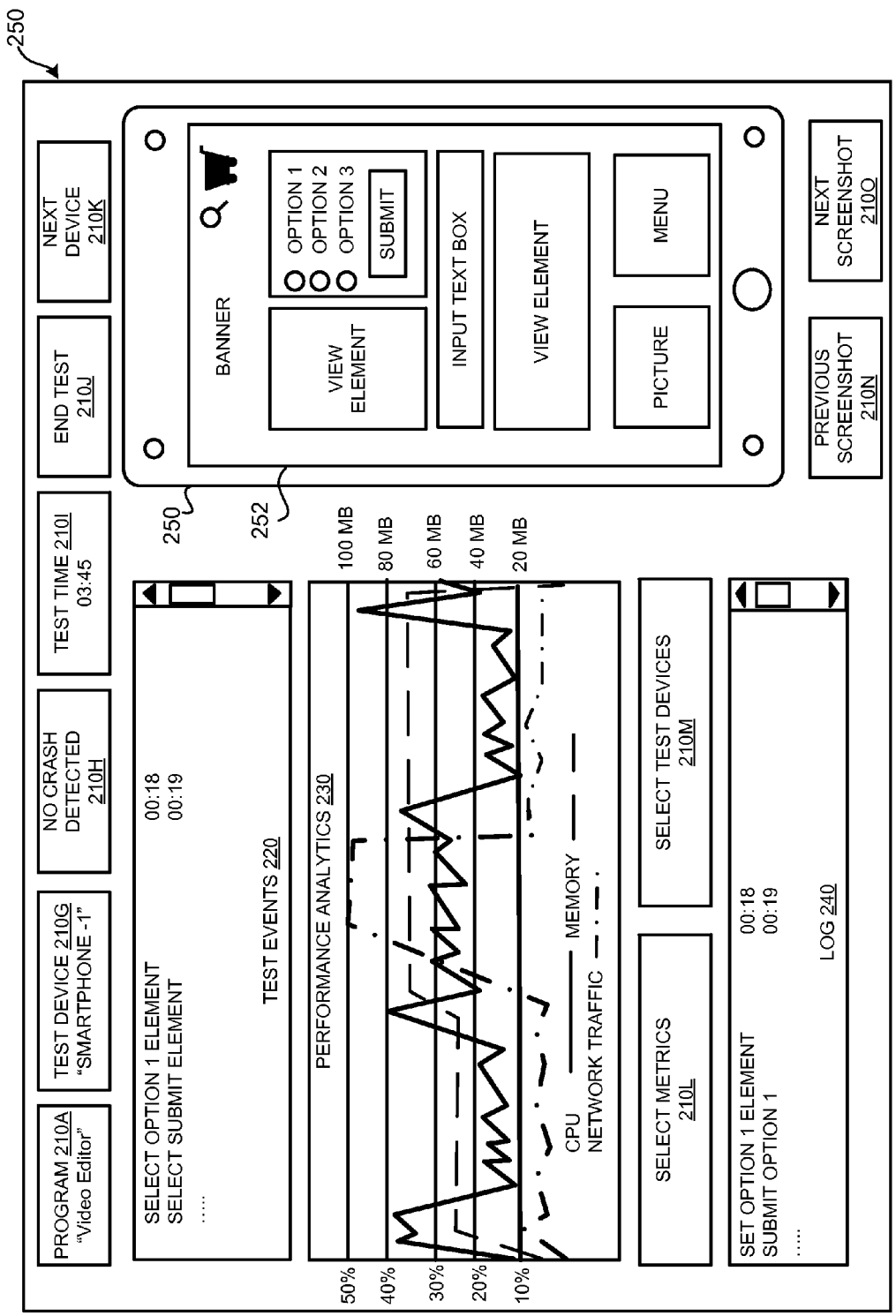

FIGS. 2A-2B are screen diagrams showing illustrative GUIs that display user interface elements associated with the monitoring of applications for compatibility issues. In some configurations, the GUI 200 and the GUI 250 might be used by the developer 102 that develops one or more of the applications 152.

FIG. 2A is a screen diagram showing an interface used to interact with the compatibility service 170. In the example shown in FIG. 2A, the GUI 200 presents an interface that includes UI elements 210A-210F, an incompatibilities 204 section, and a compatibility data 206 section. The GUI 200 might be generated by the compatibility manager 174 as shown in FIG. 1, or some other computing device or component, and presented on a computing device, such as the developer computer 106A by an application. For example, the application might be a web browser program. The GUI 200 is illustrated for explanation purposes, and is not intended to be limiting. For example, the GUI 200 might include more or fewer UI elements than illustrated in FIG. 2A. The UI elements might also be arranged in a different manner than shown in FIG. 2A.

The program name UI element 210A is configured to display the name of the application 152 or program that was tested or is currently being tested. In the current example, the name of the application 152 is "Video Editor." The program name UI element 210B displays a name ("Video Recorder API") of an API tested by the testing service 110 and associated with the developer 102. The program name UI element 210C displays a name ("Video Player") of yet another application 152 tested by the testing service 110 and associated with the developer 102. In the current example, the program name UI element 210A is displayed using a hatched pattern. The hatched pattern indicates that a the "Video Editor" application 152 has a severe compatibility issue. Other indicators may be used to indicate a severity of a compatibility issue (e.g., different colors).

The incompatibilities 204 section displays data associated with incompatibilities detected or identified by the compatibility service 170 and/or the testing service 110. In the current example, the incompatibilities 204 section displays data for each of the applications 152 associated with the developer 102. As illustrated, the program 210 display area includes data indicating that the "Video Editor" application 152 crashed on device 1 when using version 3 of an operating system. The data also indicates that the screen display does not rotate. Next to the display of the incompatibilities, a possible fix is displayed. In the current example, the suggested fix is to update an application programming interface ("API") from version 1 to version 2. Incompatibility data and fixes or possible fixes may also be displayed for the other applications (e.g., program 210B and program 210C).

The compatibility data 206 section displays compatibility data 128B obtained from the program compatibility data sources 180 as illustrated in FIG. 1. As illustrated, the compatibility data 206 section includes a display of incompatibilities or possible incompatibilities identified by two different web sites, site 1 and site 2. More or less data may be displayed. In some configurations, the developer 102 might select a link (as indicated by the underlining of "site 1" and "site 2" to view the web site or the data source that provided the compatibility data 128B.

The submit test script UI element 210D when selected, provides a mechanism for the developer 102 to upload one or more test scripts 114. The test program UI element 210E, when selected, accesses the testing service 110 to provide testing services to the developer 102. For example, the developer 102 may select the test program UI element 210E to perform additional testing on one or more of the programs 210A-210C. The submit fix UI element 210F, when selected, provides a mechanism for the developer 102 to upload one or more fixes or possible fixes for one or more of the programs 210A-210C.

FIG. 2B is a screen diagram showing a test interface used to interact with the testing service 110. In the example shown in FIG. 2B, the GUI 250 presents a test interface that includes UI elements 210A, 210G-210O, a test events 220 section, a performance analytics 230 section, a log 240 section, and a screen capture 250 section that includes a display area 252 for presenting the screen captures. The GUI 250 might be generated by the test manager 150 as shown in FIG. 1, the compatibility manager 174, or some other computing device or component, and presented on a computing device, such as the developer computer 106A by an application. For example, the application might be a web browser program, such as a web browser program. The GUI 250 is illustrated for explanation purposes, and is not intended to be limiting. For example, the GUI 250 might include more or fewer UI elements than illustrated in FIG. 2B. The UI elements might also be arranged in a different manner than shown in FIG. 2B.

The program name UI element 210A is configured to display the name of the application 152 that was tested or is currently being tested. In the current example, the name of the application 152 is "Video Editor." The test device UI element 210B displays the type of test device on which the testing is performed. In the current example, the test device is the "smartphone-1" test device. In some configurations, the type of test device UI element 210G indicates the specific type and model number of a test device. The UI element 210H is configured to display whether the application 152 crashed or not during the test. In the current example, the "Video Editor" application 152 has not crashed.

The test time UI element 210I is configured to display the amount of time that was spent testing the application 152. In the current example, the test time was three minutes and forty-five seconds. The end test UI element 210J is configured to receive a selection by a user, such as the developer 102, to end the current test. The next device UI element 210K is configured to receive a selection by the developer 102 to select another device or the next device in the selected devices 116 or device emulators 122 to perform the test. The select metrics UI element 210L is configured to receive a selection by a user to change the metrics measured during the testing of the application 152 and/or displayed in the performance analytics section 230. The select test devices UI element 210M is configured to receive a selection of one or more devices 116 or device emulators 122 that are to perform testing on the application 152. The previous screenshot UI element 210N and the next screenshot UI element 210O are configured to receive a selection to navigate the screen captures displayed in the display area 252.

In some configurations, the performance analytics section 230 shows a graphical display of different metrics that are selected for display in the GUI 250. In the current example, the user, such as the developer 102, has requested to display metrics relating to CPU performance (as indicated by the solid line in the performance analytics 230), memory performance as indicated by the line that follows a dash-dash pattern) and network traffic as indicated by the line that follows a dash-dot-dash pattern. As discussed above, the user, such as the developer 102, might select other metrics to display or collect during the testing.

The test events 220 section illustrates the different events being tested and a time indicating when the event was performed. In the current example, the test events 220 illustrates that input (simulated or real) was provided to the "option 1" element eighteen seconds into the test.

The log 240 may show information that is logged during the testing of the application 152. In some configurations, the user may specify the data that is logged. According to some examples, the user might save the log data, the test event data, or the other data displayed by the GUI 250.

In the current example, the screen capture 250 section includes a display area 252 for presenting the screen captures that are associated with the different events illustrated in the test events 220 section. As illustrated, the display area 252 shows a page generated by the "Video Editor" application 152 during testing on the "smartphone-1" test device. The display area 252 illustrated in FIG. 2B includes a variety of different elements, such as view elements, an input text box, a picture, a menu, a banner, and icons. View elements may refer to any type of visual output generated by the application 152 (e.g., user interface elements, pictures or menus).

Figure 3:
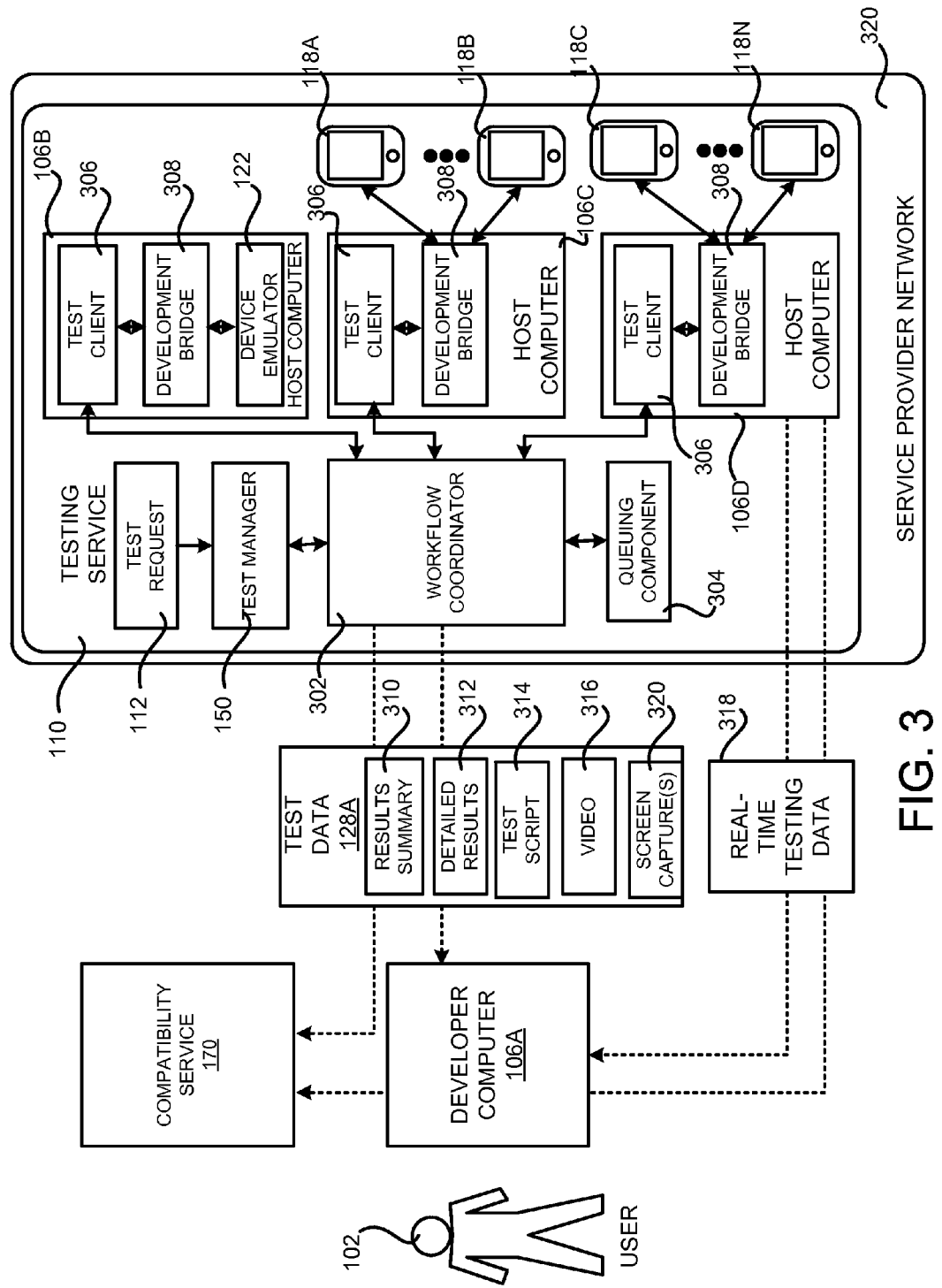
FIG. 3 is a block diagram depicting an illustrative operating environment for testing the operation of a program and providing test results to a requestor.

FIG. 3 is a block diagram depicting an illustrative operating environment for testing the operation of a program and providing test results to a requestor. As shown in FIG. 3 and described briefly above, the testing service 110 may provide a network-based service for testing the operation of one or more programs, such as the applications 152. For example, the testing service 110 may be associated with a service provider network 320. As mentioned above, the application 152 might be submitted to the testing service 110 in a test request 112 by the compatibility service 170 and/or the test developer 102, or in another manner. One illustrative operating environment for testing the operation of a program is described in U.S. patent application Ser. No. 13/875,955, which was filed on May 2, 2013, and entitled "Program Testing Service," and which is expressly incorporated herein by reference in its entirety.

In some examples, a workflow coordinator 302 within the testing service 110 receives the test request 112. As will be described in greater detail herein, the workflow coordinator 302 is a component that is configured to assign test requests 112 to host computers 106B-106D within the testing service 110. The workflow coordinator 302 might also receive test data 128A from the various host computers 106B-106D and provide the test data 128A to the developer computer 106A that submitted the test request 112, or to some other computing device.

In some examples, the workflow coordinator 302 may be configured to determine whether the test devices, such as the computing devices 118A-118N and/or the device emulators 122A, that may be requested in the test request 112 are available for use in testing the application 152. In other examples, the workflow coordinator 302 may be configured to determine whether the test devices that may be requested by the test manager 150 are available for use in testing the application 152. When the requested computing devices 118A-118N and/or the device emulators 122A-122N are not available, the workflow coordinator 302 might utilize a queuing component 304 to queue the test request 112 the requested computing devices 118A-118N and/or device emulators 122A-122N become available.

In some implementations, the test of an application 152 identified by a test request 112 may be queued if one or more of the test devices are unavailable. In other examples, only those test requests 112 that request tests to be performed on unavailable test devices might be queued. Other mechanisms might also be utilized for queuing test requests 112 in other implementations.

If the test devices upon which a test of an application 152 is to be performed are available, the workflow coordinator 302 may transmit the test request 112 to test clients 306 executing on the host computers 106B-106D. For example, if a test request 112 indicates that the application 152 is to be tested while executing on a computing device 118A, the workflow coordinator 302 may transmit the test request 112 to the test client 306 executing on the host computer 116B. In a similar fashion, if a test request 112 indicates that a test is to be performed using a device emulator 122A, the workflow coordinator 302 may transmit the test request 112 to the test client 306 executing on the host computer 116A.

The test client 306 executing on each of the host computers 106B-106D may be configured to receive test requests 112 from the workflow coordinator 302. According to some examples, the test clients 306 are configured to systematically interact and test the applications 152 for compatibility issues, as discussed herein. In response to receiving a test request 112, the test client 306 may cause a development bridge 308 to install the application 152 on the computing device 118 or the device emulator 122 to be tested. According to some configurations, the development bridge 308 provides a mechanism for interacting with a connected computing device 118 or device emulator 122.

In some configurations, the development bridge 308 is the ANDROID Debug Bridge. The ANDROID Debug Bridge may be utilized when the computing devices 118A-118N and/or the device emulators 122A-122N utilize the ANDROID operating system. Other types of bridges might also be utilized when computing devices 118A-118N and/or device emulators 122 configured with other operating systems from other manufacturers are utilized to test the operation of an application 152.

Once the application 152 to be tested has been installed on the computing devices 118A-118N and/or device emulators 122 upon which testing should occur, the operation of the application 152 may be tested using the test manager 150. As described above, the application 152 may be tested by the test manager 150, the test client 306, or some other component. As discussed above, the testing is configured to test various aspects the operation of an application 152 on the target computing devices 118A-118N and/or device emulators 122.

According to some examples, the host computers 106B-106D may be configured to transmit real-time testing data 318 to the developer computer 106, or some other computing device, while the testing of the application 152 is being performed. For example, in some implementations, the real-time testing data 318 includes text data describing the on-going testing of an application 152 (e.g., the current event being performed) on a particular computing device 118A-118N or device emulator 122. In other implementations, the real-time testing data 318 may include one or more screen captures 320, or a video display output generated by one of the computing devices 118A-118N and/or device emulators 122 utilized for testing.

The real time testing data 318 might then be presented on the developer computer 106A for viewing by the developer 102. In this manner, the developer 102, or some other user, can view the real time operational testing of the application 152 on a computing device 118A-118N or device emulator 122. When multiple tests are being performed simultaneously, a mechanism might be utilized at the developer computer 106A that allows the developer 102 to select a computing device 118A-118N and/or device emulator 122A-122N for which the real-time testing data 318 is displayed.

Once the testing of the application 152 has completed on the computing devices 118A-118N and/or the device emulators 122A-122N, each of the host computers 106B-106D provides test data 128A to the workflow coordinator 302. In turn, the workflow coordinator 302 provides the test data 128A to the compatibility service 170 and/or the developer computer 106A. As shown in FIG. 3, the test data 128A might include a results summary 310, which indicates whether the tests passed or failed. The test data 128A might also include detailed results 312 that include detailed information regarding the performance of the tests on the computing devices 118A-118N and/or device emulators 122. For example, the detailed results 312 might include log files and/or other detailed results generated by the computing device 118, emulator 122, and/or development bridge 308 during the testing of the application 152 on the computing devices 118A-118N and/or the device emulators 122. In some examples, the test data 128A includes a test script 314. The test script 314 might be used by the developer 104 to recreate the test and/or view the steps that were part of one or more tests performed by the testing service 110.

In some implementations, the test data 128A also includes screen captures 320 taken on the computing devices 118 and/or the device emulators 122 during the testing of the application 152. Similarly, the test data 128A might also include video 316 captured from the computing devices 118 and/or the device emulators 122 during all or a portion of the testing of the application 152. The content of the test data 128A illustrated in FIG. 3 are merely illustrative and that other types of information might be provided in the test data 128A.

Appropriate functionality might also be provided at the developer computer 106 for presenting the test data 128A to the developer 102. Utilizing the test data 128A, the developer 102 can make changes to the application 152. The developer 102 might then resubmit the application 152 to the testing service 110 for continued testing in the manner described above.

Figure 4:
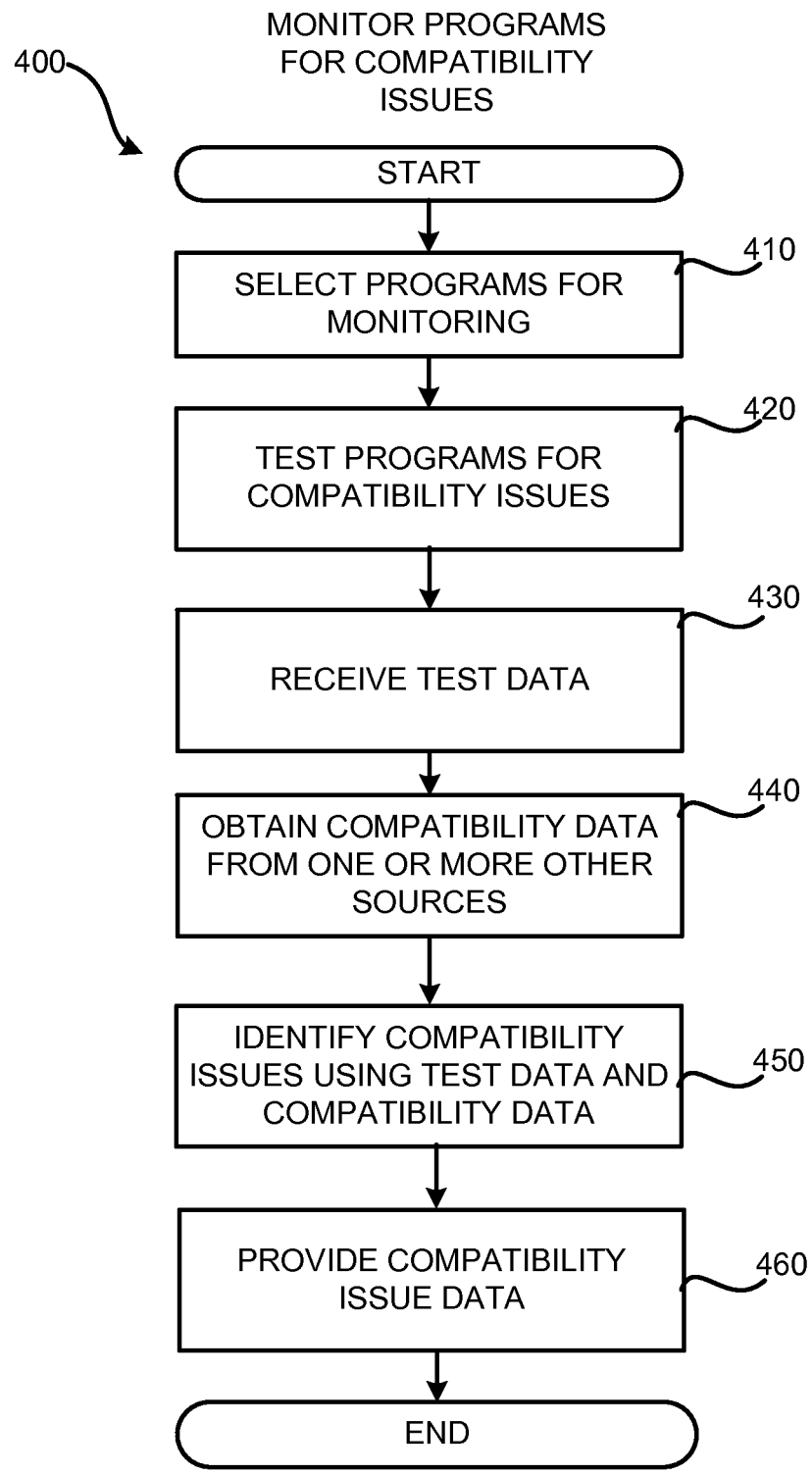
FIG. 4 is a flow diagram showing a routine illustrating aspects of a mechanism disclosed herein for monitoring programs for compatibility issues.

FIG. 4 is a flow diagram showing a routine 400 illustrating aspects of a mechanism disclosed herein for monitoring programs for compatibility issues. It should be appreciated that the logical operations described herein with respect to FIG. 4, and the other FIGS. may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 400 may begin at operation 410, where programs are selected for monitoring. As described above, one or more applications 152 may be selected for monitoring. The applications 152 selected for monitoring may include all or a portion of the applications 152 available from one or more application stores. In other examples, the applications 152 selected for monitoring may include the applications 152 associated with one or more developers that are users of the compatibility service 170.

From operation 410, the routine 400 may flow to operation 420, where the programs are tested for compatibility issues. As discussed above, the applications 152 may be tested using the testing service 110. As also discussed above, the compatibility service 170 and/or the testing service 110 may test the program in response to different events (See FIG. 5).

From operation 420, the routine 400 may proceed to operation 430 where test data 128A may be received. As discussed above, the test data 128A might be provided to the compatibility service 170 and/or the developer computer 106 and might include the results summary 310, detailed results 312, test script 314, screen captures 320, and/or video 316 in various examples.

From operation 430, the routine 400 may proceed to operation 440 where compatibility data 128 is obtained. As discussed above, the compatibility data 128 may be obtained from program compatibility data sources 180. The program compatibility data sources 180 might include web sites, data stores, data received from developers, social networks, and the like.

From operation 440, the routine 400 may proceed to operation 450 where compatibility issues are determined using the test data 128A and the compatibility data 128B. As discussed above, the compatibility manager 174 of the compatibility service 170 may determine that the test data 128A and/or the compatibility data 128B indicates one or more compatibility issues with one or more of the applications 152 being monitored.

From operation 450, the routine 400 may proceed to operation 460 where the compatibility issue data 128C is provided. As discussed above, the compatibility issue data 128C may be provided by messages (e.g., emails, notifications, or texts) and/or through the UI 104. For instance, an appropriate component executing on the developer computer 106A, such as a plug-in or a Web browser program or the UI 104 may be utilized to present the compatibility issue data 128C and/or the test data 128A to the developer 102. From operation 460, the routine 400 proceeds to and end operation.

Figure 5:
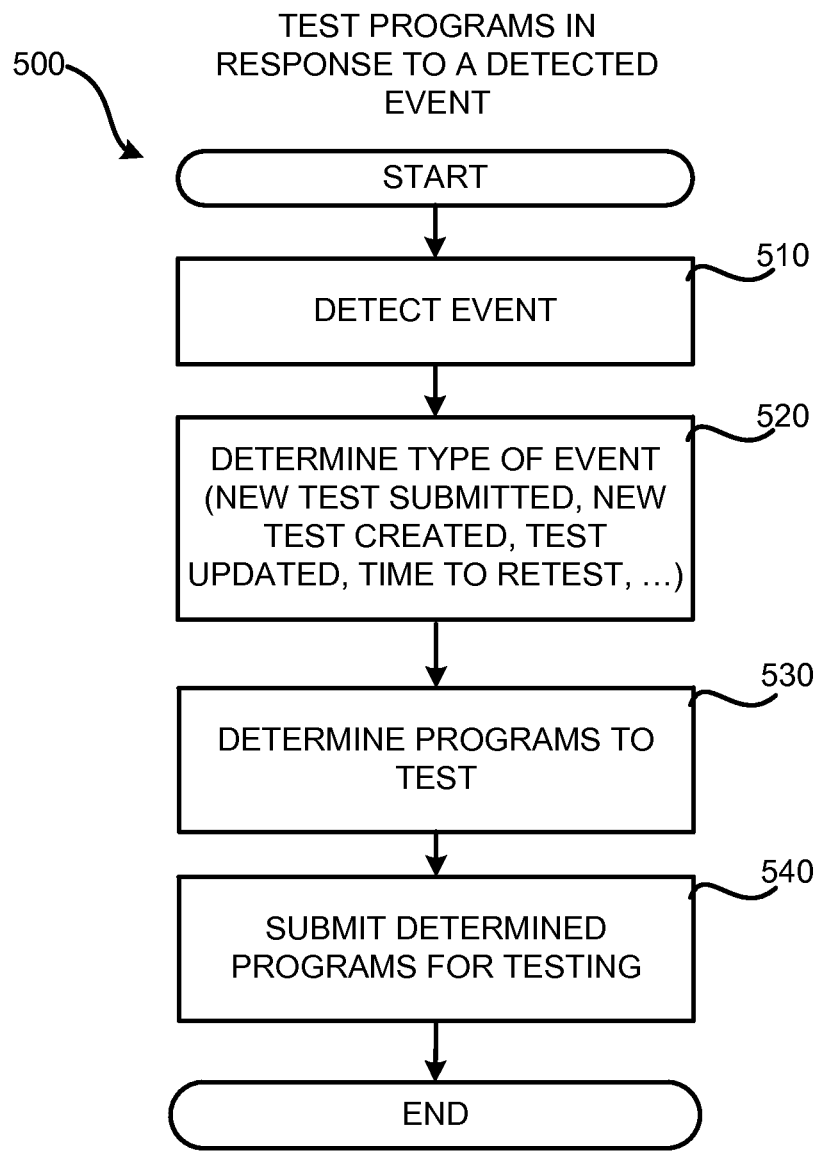
FIG. 5 is a flow diagram showing a routine illustrating aspects of the operation for testing programs in response to an occurrence of an event.

FIG. 5 is a flow diagram showing a routine 500 illustrating aspects of a mechanism disclosed herein for testing programs in response to an occurrence of an event. The routine 500 may begin at operation 510, where an event is detected. As discussed above, the event may be detected by the compatibility service 170 and/or the testing service 110. The event may be generated by the developer 102 and/or by the compatibility service 170 and/or the testing service 110. For example, the developer 102 may submit a new test to the testing service 110 or the compatibility service 170. In other examples, the testing service 110 might create a new test. In yet other examples, the event may be associated with a specified time to perform tests (e.g., daily, weekly, or monthly).

From operation 510, the routine 500 may proceed to operation 520, where the type of event is determined. As discussed above, some events that may be detected include, but are not limited to a new test being submitted to the configuration service 170 and/or the testing service, a new test created by the developer 102, the configuration service 170 or the testing service, a test being updated, a specified time reached, and the like.

From operation 520, the routine 500 may proceed to operation 530, where a determination is made as to what programs are to be tested. As discussed above, the testing service 110 and/or the compatibility service 170 may determine the programs to test based upon the applicability of the test to the program. For instance, if the type of event is a new or updated test, the compatibility service 170 and/or the testing service may identify the applications 152 in the applications catalog 162 that include functionality related to the test.

From operation 530, the routine 500 may proceed to operation 540, where the determined programs to test are submitted for testing. As discussed above, the programs may be submitted by the compatibility service 170 to the testing service 110 to be tested. From operation 540, the routine 500 may proceed to an end operation.

Figure 6:
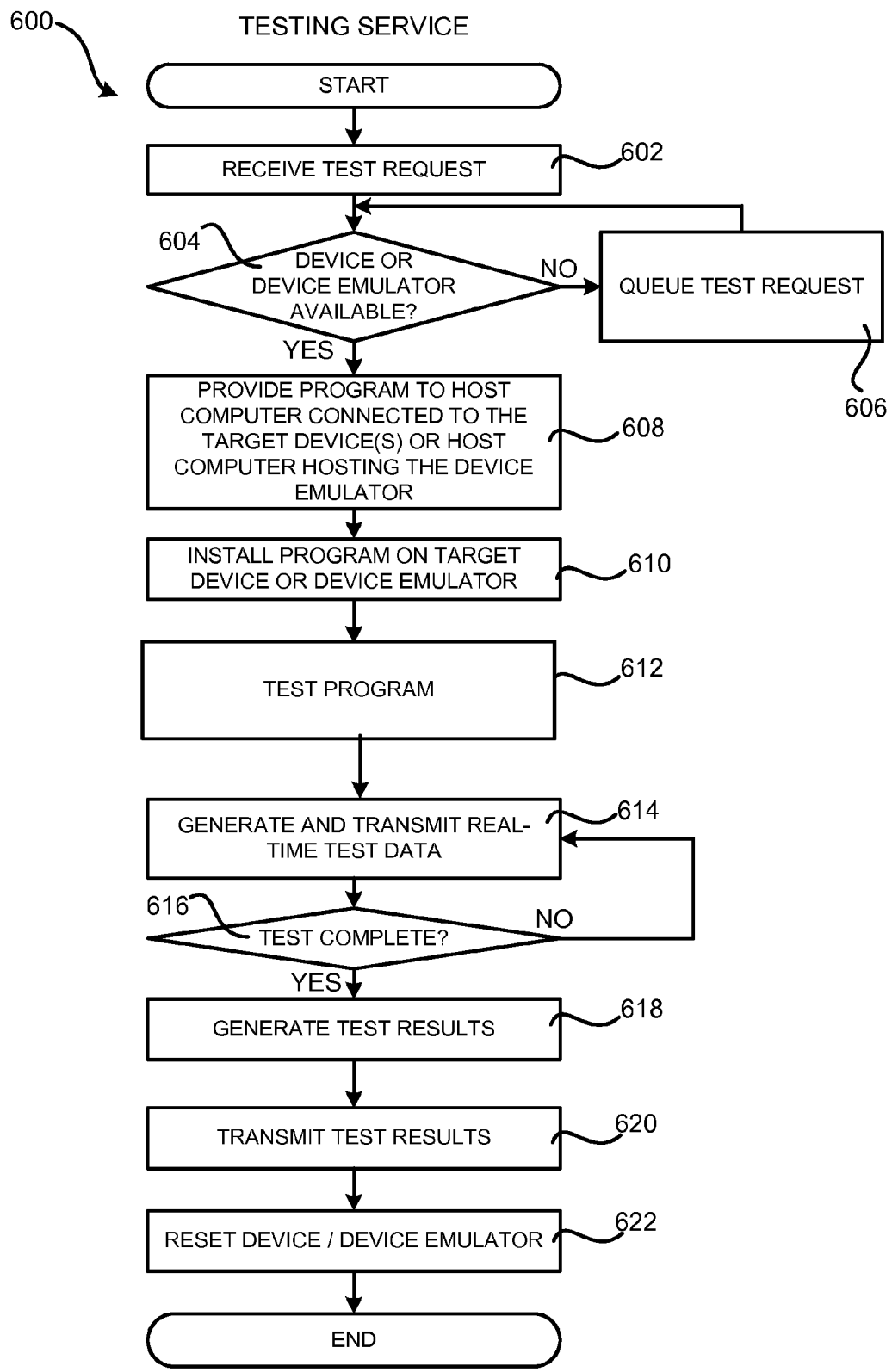
FIG. 6 is a flow diagram showing a routine illustrating aspects of the operation of a testing service configured to test the operation of an application and for provide test data associated with the testing.

FIG. 6 is a flow diagram showing a routine 600 illustrating aspects of a mechanism disclosed herein for the operation of components in a service provider network 320 for testing the operation of an application 152 and for providing test data 128 associated with the testing. The routine 600 may begin at operation 602, where the testing service 110 receives a test request 112. In response to receiving a test request 112, the workflow coordinator 302, the test manager 150, or another component within the testing service 110, may determine, at operation 604, whether the computing devices 118A-118N and/or device emulators 122A-122N are selected for testing are available. As discussed above, in some examples, the computing devices are selected by the developer 102.

If the requested computing devices 118 and/or device emulators 122 are not available, the routine 600 may proceed to operation 606, where the test request 112 may be queued. As discussed above, a queuing component 304 may be provided in the testing service 110 for queuing test requests 112 until the requested computing devices 118A-118N and/or device emulators 122 become available.

When, at operation 604, the workflow coordinator 302 determines that the requested computing devices 118A-118N and/or device emulators 122 are available, the routine 600 proceeds from operation 604 to operation 608. At operation 608, the workflow coordinator 302 provides the test request 112, that may include the application 152, to host computers 106B-106D hosting the computing devices 118A-118N and/or device emulators 122 upon which testing should occur.

The routine 600 may then proceed to operation 610, where the development bridge 308 on the respective host computer 106 installs the application 152 on the identified test devices (e.g., the computing device 118 and/or the device emulators 122) upon which testing is to occur.

Once the application 152 has been installed, the routine 600 may proceed to operation 612 where the application 152 is tested. The application 152 may be tested and explored on the computing devices 118A-118N and/or device emulators 122. In some examples, real-time testing data 318 might be transmitted, at operation 614, to the compatibility service 170 and/or the developer computer 106 during the testing of the application 152.

From operation 614, the routine 600 may proceed to operation 616, where a determination is made as to whether the testing of the application 152 has been completed. If testing has not been completed, the routine 600 may proceed back to operation 614, where the testing service 110 may continue to transmit real-time testing data 318 to the compatibility service 170 and/or the developer computer 106 in the manner described above. If, however, testing of the application 152 has been completed, the routine 600 may flow to operation 618.

At operation 618, the test data 128A may be generated. As discussed above, the testing service 110 may generate the test data 128A. In some examples, the test data 128A might include the results summary 310, detailed results 312, screen captures 140, and/or video 316 in various examples. The test data 128A might also include other data not specifically mentioned herein.

From operation 618, the routine 600 may proceed to operation 620, where the test data 128A are transmitted to the compatibility service 170 and/or the developer computer 106 for presentation to the developer 102, to identify the compatibility issues, or use in another manner. As illustrated by operation 622, once the test data 128A have been transmitted to the developer computer 106, a component within the testing service 110, such as the development bridge 308 may be is utilized to reset the computing devices 118A-118N and/or device emulators 122 upon which testing occurred. In this way the computing devices 118 and/or device emulators 122 can be placed into a baseline state for future testing. From operation 622, the routine 600 may proceed to an end operation.

Figure 7:
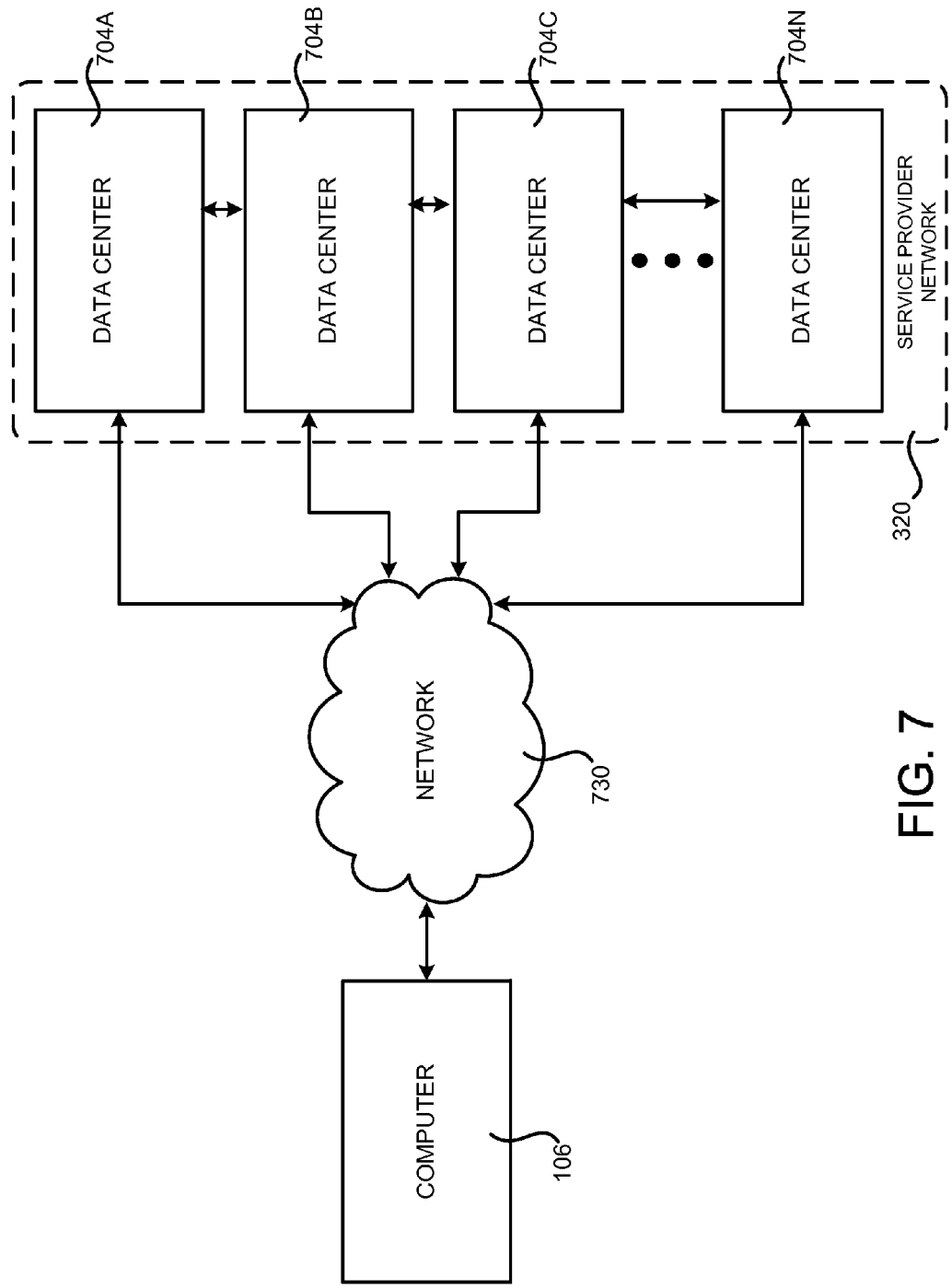
FIG. 7 is a system and network diagram that shows one illustrative operating environment for the technologies disclosed herein that includes a service provider network.

FIG. 7 and the following description are intended to provide a brief, general description of a suitable computing environment in which the technologies described herein may be implemented. In particular, FIG. 7 is a system and network diagram that shows an illustrative operating environment that includes a service provider network 320. In some configurations, the service provider network 320 can provide virtual machine instances and computing resources on a permanent or an as-needed basis.

The computing resources provided by the service provider network 320 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by the service provider network 320 are enabled in one implementation by one or more data centers 704A-704N (which may be referred to herein singularly as "a data center 704" or collectively as "the data centers 704"). The data centers 704 are facilities utilized to house and operate computer systems and associated components. The data centers 704 typically include redundant and backup power, communications, cooling and security systems. The data centers 704 might also be located in geographically disparate locations. One illustrative configuration for a data center 704 that implements some or all of the concepts and technologies disclosed herein will be described below with regard to FIG. 8.

The users and customers of the service provider network 320 may access the computing resources provided by the data centers 704 over a suitable data communications network, such as a Wide Area Network ("WAN"), as illustrated by network 730. Although a WAN might be used, it should be appreciated that a local-area network ("LAN"), the Internet, or any other networking topology known in the art that connects the data centers 704 to the developer computer 106 may be utilized. It should also be appreciated that combinations of such networks might also be utilized.

Figure 8:
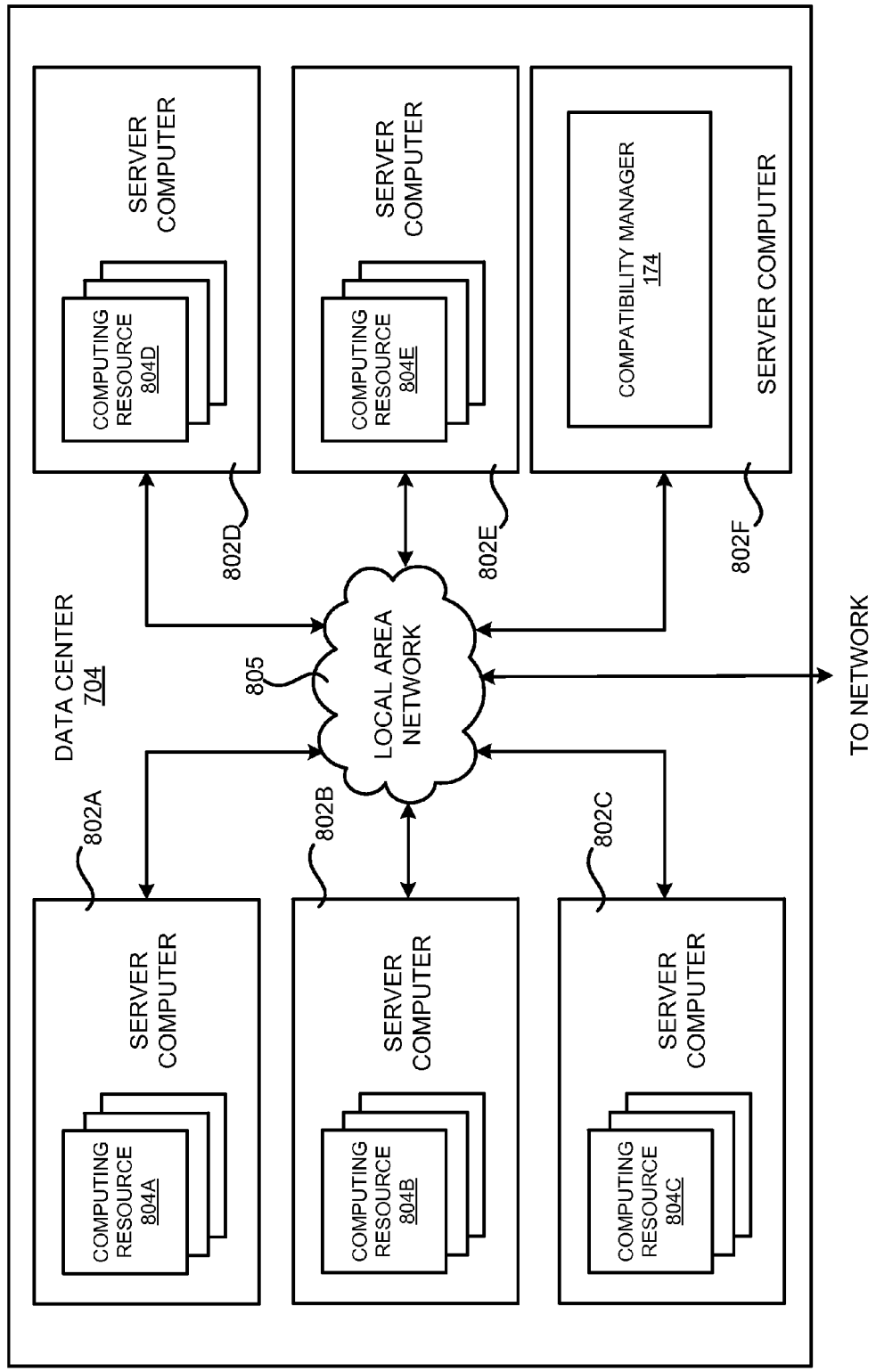
FIG. 8 is a computing system diagram that illustrates one configuration for a data center that implements aspects of a service provider network, including some or all of the concepts and technologies disclosed herein relating to monitoring applications for compatibility issues.

FIG. 8 is a computing system diagram that illustrates one configuration for a data center 704 that implements aspects of a service provider network 320, including some or all of the concepts and technologies disclosed herein relating to testing an application 152. The example data center 704 shown in FIG. 8 includes several server computers 802A-802E (which may be referred to herein singularly as "a server computer 802" or in the plural as "the server computers 802") for providing computing resources. The server computers 802 may be standard tower or rack-mount server computers configured appropriately for providing the computing resources described herein. According to some configurations, the server computers 802 are configured to execute test manager 150, or other components, as described above.

In one configuration, some of the computing resources 804 are virtual machine instances. As known in the art, a virtual machine instance is an instance of a software implementation of a machine (i.e. a computer) that executes programs like a physical machine. Each of the server computers 802 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 802, for example.

It should be appreciated that although the technologies disclosed herein are described primarily in the context of virtual machine instances, other types of computing resources can be utilized with the concepts and technologies disclosed herein. For instance, the technologies disclosed herein might be utilized with hardware resources, data storage resources, data communications resources, networking resources, database resources and with other types of computing resources.

The data center 704 shown in FIG. 8 also includes a server computer 802F reserved for executing software components for managing the operation of the data center 704, the server computers 802, virtual machine instances, and other resources within the service provider network 320. The server computer 802F might also execute the compatibility manager 174 as well as other components described herein. Details regarding the operation of each of these components has been provided above. In this regard, it should be appreciated that while these components are illustrated as executing within the service provider network 320, computing systems that are external to the service provider network 320 might also be utilized to execute some or all of these components. Other configurations might also be utilized.

In the example data center 704 shown in FIG. 8, an appropriate LAN 805 is utilized to interconnect the server computers 802A-802E and the server computer 802F. The LAN 805 is also connected to the network 730 illustrated in FIG. 7. It should be appreciated that the configuration and network topology illustrated in FIGS. 7 and 8 has been greatly simplified and that many more computing systems, networks and networking devices may be utilized to interconnect the various computing systems disclosed herein. Appropriate load balancing devices or software modules might also be utilized for balancing a load between each of the data centers 704A-704N, between each of the server computers 802A-802F in each data center 704 and between virtual machine instances and other types of computing resources provided by the service provider network 320.

It should be appreciated that the data center 704 described in FIG. 8 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 9:
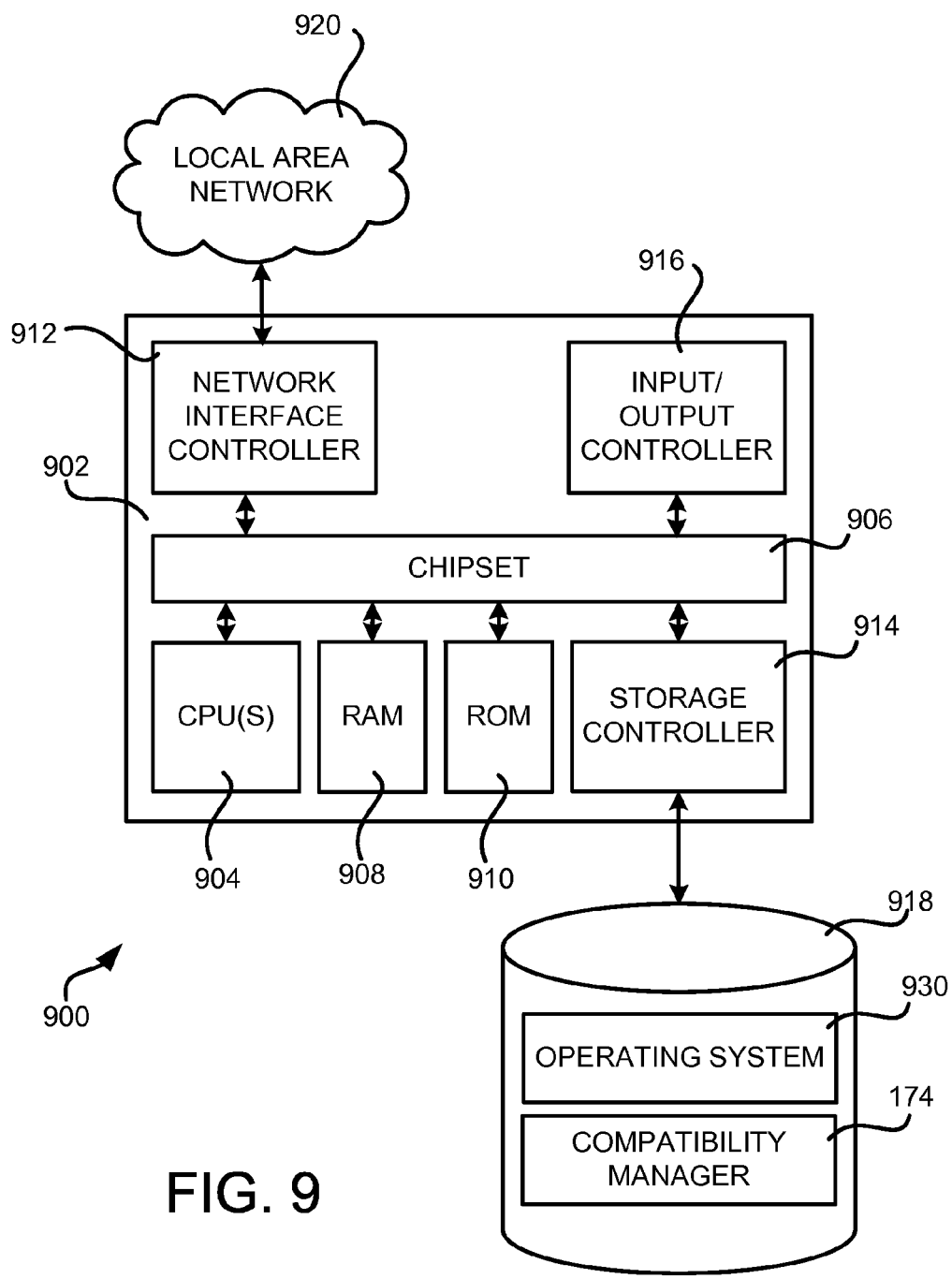
FIG. 9 is a computer architecture diagram showing an illustrative computer hardware architecture for implementing a computing device that might be utilized to implement aspects of the various technologies presented herein.

FIG. 9 shows an example computer architecture for a computer 900 capable of executing the program components described above for monitoring applications for compatibility issues. The computer architecture shown in FIG. 9 illustrates a conventional server computer, workstation, desktop computer, laptop, tablet computing device, network appliance, personal digital assistant ("PDA"), e-reader, digital cellular phone, or other computing device, and may be utilized to execute any aspects of the software components presented herein. For example, the computer architecture shown in FIG. 9 may be utilized to execute the compatibility manager 174, and/or the other components shown in FIGS. and described above.

The computer 900 includes a baseboard 902, or "motherboard," which is a printed circuit board to which a multitude of components or devices may be connected by way of a system bus or other electrical communication paths. In some configurations, one or more central processing units ("CPUs") 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 may provide an interface to a random access memory ("RAM") 908, used as the main memory in the computer 900. The chipset 906 may further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM may also store other software components necessary for the operation of the computer 900 in accordance with the technologies described herein.

The computer 900 may operate in a networked environment using logical connections to remote computing devices and computer systems through a network, such as the local area network 920. The chipset 906 may include functionality for providing network connectivity through a NIC 912, such as a gigabit Ethernet adapter. The NIC 912 is capable of connecting the computer 900 to other computing devices over the network 920. It should be appreciated that multiple NICs 912 may be present in the computer 900, connecting the computer to other types of networks and remote computer systems.

The computer 900 may be connected to a mass storage device 918 that provides non-volatile storage for the computer. The mass storage device 918 may store system programs, application programs, other program modules, and data, which have been described in greater detail herein. The mass storage device 918 may be connected to the computer 900 through a storage controller 914 connected to the chipset 906. The mass storage device 918 may consist of one or more physical storage units. The storage controller 914 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 may store data on the mass storage device 918 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 918 is characterized as primary or secondary storage, and the like.

For example, the computer 900 may store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 918 by detecting the physical states or characteristics of one or more particular locations within the physical storage units.

In addition to the mass storage device 918 described above, the computer 900 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 900.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 918 may store an operating system 930 utilized to control the operation of the computer 900. According to some examples, the operating system comprises the LINUX operating system. According to another example, the operating system comprises the WINDOWS® SERVER operating system from MICROSOFT Corporation. According to further examples, the operating system may comprise the UNIX or ANDROID operating systems. It should be appreciated that other operating systems may also be utilized. The mass storage device 918 may store other system or application programs and data utilized by the computer 900, such as the compatibility manager 174, and/or any of the other software components and data described above. The mass storage device 918 might also store other programs and data not specifically identified herein.

In some configurations, the mass storage device 918 or other computer-readable storage media is encoded with computer-executable instructions which, when loaded into the computer 900, transforms the computer from a general-purpose computing system into a special-purpose computer capable of implementing the technologies described herein. These computer-executable instructions transform the computer 900 by specifying how the CPUs 904 transition between states, as described above. According to some examples, the computer 900 has access to computer-readable storage media storing computer-executable instructions which, when executed by the computer 900, perform the various routines described above with regard to FIGS. 4-6. The computer 900 might also include computer-readable storage media for performing any of the other computer-implemented operations described herein.

The computer 900 may also include one or more input/output controllers 916 for receiving and processing input from a number of input devices, such as a keyboard, a mouse, a touchpad, a touch screen, an electronic stylus, or other type of input device. Similarly, the input/output controller 916 may provide output to a display, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

Based on the foregoing, it should be appreciated that technologies for implementing and utilizing a network-based compatibility service and program testing service have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to:
   instruct a testing service to test one or more programs, associated with an application catalog of an electronic marketplace, for one or more first compatibility issues across one or more of computing devices, operating systems or software development kits (SDKs), based at least in part on detecting one or more of receiving a test, creating a new test, or updating an existing test;
   receive test data associated with the testing of the programs for the first incompatibility issues;
   receive compatibility data from one or more external data sources, the compatibility data indicating an operational issue for one or more of the programs;
   identify one or more incompatibilities of one or more of the programs based, at least in part, on the test data and compatibility data; and
   provide data identifying the one or more incompatibilities.

2. The non-transitory computer-readable storage medium of claim 1, wherein provide the data identifying the one or more incompatibilities comprises sending a message to a remote computing device, the message identifying a severity level of the one or more incompatibilities and a possible fix for the one or more incompatibilities.

3. The non-transitory computer-readable storage medium of claim 2, wherein provide the data identifying the one or more incompatibilities comprises providing a graphical user interface that displays data relating to the one or more incompatibilities.

4. The non-transitory computer-readable storage medium of claim 1, wherein a testing service performing the testing of the programs is implemented within a service provider network.

5. The non-transitory computer-readable storage medium of claim 3, wherein providing the graphical user interface comprises providing for display within the graphical user interface at least a portion of the compatibility data obtained from the one or more one or more external data sources, an indication of a location of the one or more external data sources, and incompatibility data determined from the testing of the programs.

6. A system, comprising:
   one or more computing devices operative to instruct a testing service to test programs for one or more first compatibility issues across one or more of computing devices, operating systems or software development kits (SDKs), based at least in part on detection of one or more of receiving a test, creating a new test, or updating an existing test;
   receive test data associated with the testing of the programs;
   receive compatibility data from one or more sources, the compatibility data indicating an operational issue for one or more of the programs;
   identify one or more incompatibilities of one or more of the program based, at least in part, on the test data and compatibility data; and
   provide data identifying the one or more incompatibilities.

7. The system of claim 6, wherein receive the test data comprises receiving the test data from the testing service that tests the programs.

8. The system of claim 6, wherein provide the data identifying the one or more incompatibilities comprises sending a message to a computing device, the message identifying a type of one or more incompatibilities and a severity level of the one or more incompatibilities.

9. The system of claim 8, wherein sending the message comprises sending the message in response to the severity level of the one or more incompatibilities exceeding a specified threshold.

10. The system of claim 6, wherein the one or more computing devices are further operative to receive a fix that addresses one or more of the identified incompatibilities and to make the fix available to developers associated with one or more of the programs.

11. The system of claim 6, wherein the one or more computing devices are further operative to
   receive a test script that includes data associated with instructions used to test one or more of the programs, and
   make the test script available to developers of a compatibility service.

12. The system of claim 6, wherein provide the data comprises sending data to a developer computing device to display test results in a graphical user interface (GUI).

13. The system of claim 12, wherein the GUI includes a user interface element for selecting one or more test devices to perform a further test on one or more of the programs.

14. The system of claim 12, wherein the GUI provides a display of data that shows test events performed during the testing, a display of one or more metrics captured during the testing and a display of one or more screen captures generated during the testing.

15. A computer-implemented method for testing the operation of a program, the method comprising:
- instructing a testing service to test programs based at least in part on detecting one or more of receiving a test, creating a new test, or updating an existing test;
- receiving, from the testing service, test data associated with the testing of programs;
- receiving compatibility data from one or more sources, the compatibility data identifying an operational issue for one or more of the programs;
- identifying one or more incompatibilities of one or more of the programs based, at least in part, on the test data and compatibility data; and
- providing data identifying the one or more incompatibilities.

16. The computer-implemented method of claim 15, wherein providing the data identifying the one or more incompatibilities comprises one or more of sending a message to a computing device or providing a graphical user interface that displays data associated with one or more of the incompatibilities.

17. The computer-implemented method of claim 16, wherein sending the message comprises sending the message in response to the severity level of the one or more incompatibilities exceeding a specified threshold.

* * * * *